United States Patent

[11] 3,604,490

| [72] | Inventor | Melvin E. Bricker<br>2723 Saddleback Drive, Cincinnati, Ohio 45244 |
|---|---|---|
| [21] | Appl. No. | 875,806 |
| [22] | Filed | Nov. 12, 1969 |
| [45] | Patented | Sept. 14, 1971 |

[54] SHREDDER PLATE
3 Claims, 6 Drawing Figs.

[52] U.S. Cl. .................................................. 146/177,
29/78, 76/101 A, 146/114
[51] Int. Cl. ..................................................... B02c 19/20
[50] Field of Search .......................................... 146/177–180,
61, 113 R, 114, 115; 29/78; 76/101
R, 101 A, 24 R

[56] References Cited
UNITED STATES PATENTS

| 2,708,376 | 5/1955 | Booth | 76/24 R |
| 3,121,450 | 2/1964 | Cronheim | 146/177 |

FOREIGN PATENTS

| 501,056 | 11/1954 | Italy | 146/177 |

Primary Examiner—Willie G. Abercrombie
Attorney—Wood, Herron & Evans

ABSTRACT: A shredder plate for use with high-speed rotary vegetable cutter drives. The shredder plate includes a plurality of cutter openings and adjacent cutter flanges. Each cutter flange is arcuate and terminates in a cutting edge forming a continuation of the periphery of the adjacent opening. The flanges taper from a maximum width at the cutting edge to an apex. The length of the flange along the centerline is approximately equal to one-half of the diameter of the opening and the centerline of the flange makes an angle of approximately 40° with the plate.

PATENTED SEP 14 1971
3,604,490
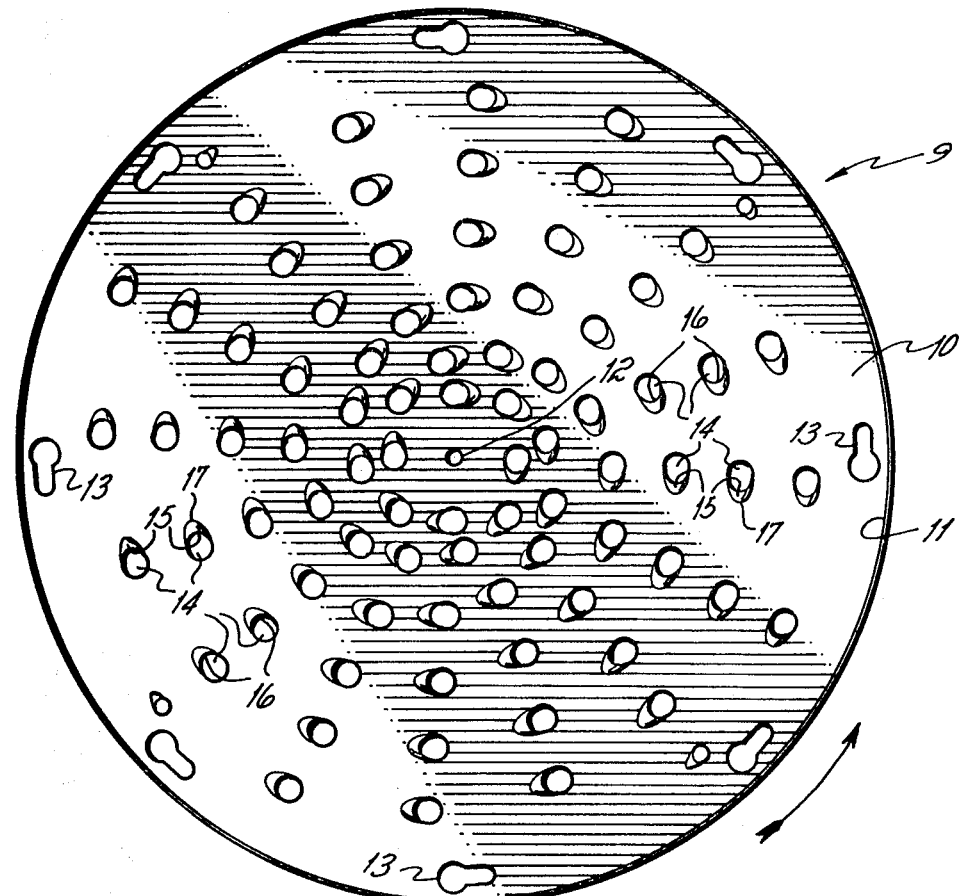
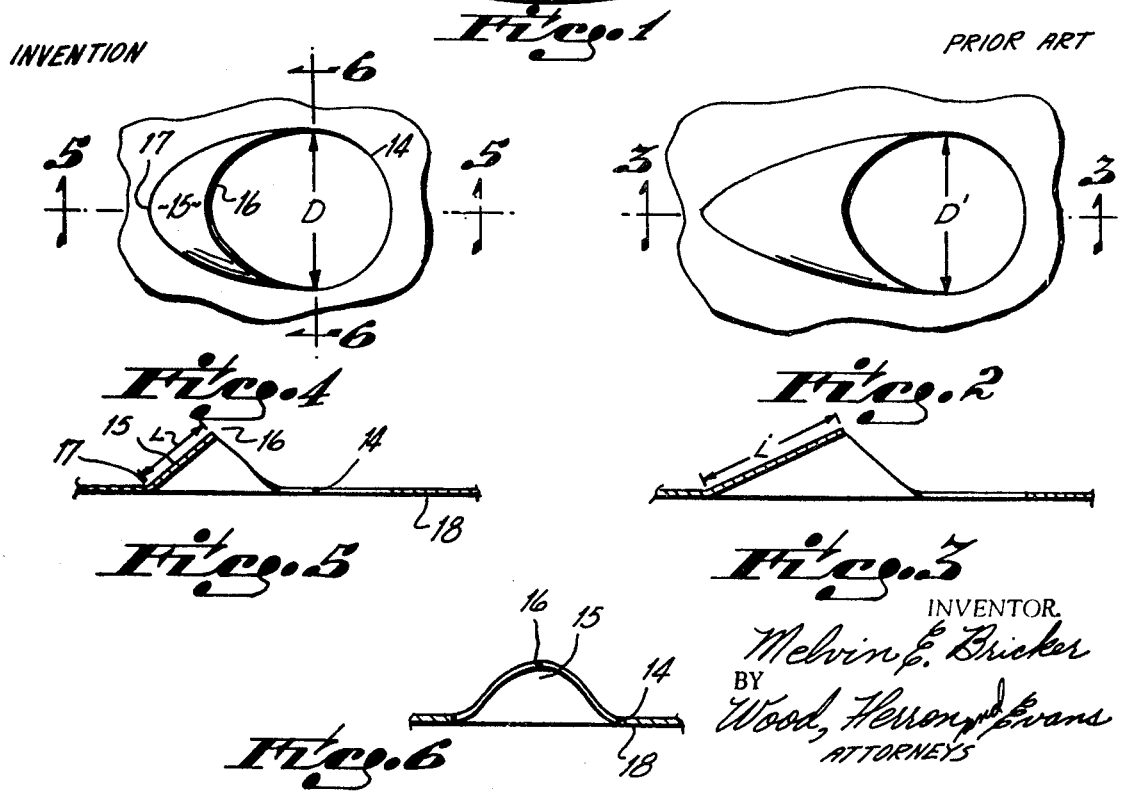
INVENTOR.
Melvin E. Bricker
BY
Wood, Herron & Evans
ATTORNEYS

ID:3,604,490

SHREDDER PLATE

BACKGROUND OF THE INVENTION

This invention relates to vegetable-cutting apparatus and is particularly directed to a shredder plate adapted for use with high-speed vegetable-cutting equipment.

In recent years there has been a trend toward the use of substantially higher speeds in the operation of vegetable cutters; for example, the speed of operation of these cutters has been raised from approximately 200 r.p.m. to between 600–800 r.p.m. One such form of high-speed vegetable-cutting equipment is shown in Melvin E. Bricker U.S. Pat. No. 3,416,583 for "Vegetable Cutter Apparatus," granted Dec. 17, 1968. In general, vegetable cutters of this type include a hopper for holding the vegetables, such as cabbage, potatoes, celery, carrots, or the like, to be chopped; a rotary drive shaft and a shredder disc mounted on the drive shaft. The shredder disc is provided with a plurality of holes and adjacent arcuate cutter flanges. When this disc is rotated at high speed, the cutter flanges bite into the vegetables being sliced and sever off shreds which pass through the openings in the shredder plate and are discharged through a discharge passage behind the shredder plate.

The principal object of the present invention is to provide a shredder plate of this general type having a novel configuration and relationship between the cutter flanges and openings which result in a markedly superior cutting and shredding action.

In the present shredder plate, the openings are generally circular. One cutting flange is disposed adjacent to each opening, the flange terminating in a cutting edge that forms an extension of said opening. The flanges are in the form of arcuate bows and taper from a maximum width adjacent to the opening to an apex remote from the opening. The present invention is predicated upon the empirical discovery and determination that a vastly improved cutting action is obtained when the length of the cutting flange along its centerline line is made approximately equal to one-half of the diameter of the cutting opening. Additionally, I have found that an improved cutting action centerline obtained when the angle of the flange along this centerline to the plane of the center disc is of the order of 40°.

When vegetables are comminuted with a shredder plate of the present invention, several highly advantageous results are obtained. One of these highly desirable results is that the comminuted product; for example, slaw or potato shreds, has substantially less free juice than when using shredder plates of the prior art.

A second highly advantageous result of the present shredder plate is that it is effective to comminute vegetables in substantially less time than is possible with the shredder plates of the prior art.

A third highly important advantage of the present shredder plate is that it is effective to comminute vegetables with only a minimal pressure being exerted on the vegetables by the operator. This not only makes it easier for the operator, but imposes less strain on the driving mechanism.

A further advantage of the present shredder plate design is that it is effective to produce a very uniform shredded product; for example, coleslaw or hash brown potatoes.

A still further advantage of the present shredder plate is that it is effective to produce products, such as coleslaw, having a substantially shorter length of shred than is produced by a shredder plate of the prior art design. Coleslaw made from cabbage having a short shred has proven to be highly desirable, particularly in drive-in and carryout food establishments, because the slaw can readily be eaten with a lightweight plastic utensil. Celery cut with this plate is also in a highly desirable form, usable as diced celery for salads and the like.

These and other objects and advantages of the present invention will be more readily apparent from a consideration of the following detailed description of the drawings illustrating a preferred embodiment of the invention.

DESCRIPTION OF THE DRAWINGS

FIG. 1 is a plan view of a shredder plate constructed in accordance with the principles of the present invention.

FIG. 2 is an enlarged plan view of one of the openings and cutter flanges of the prior art.

FIG. 3 is a cross-sectional view taken along line 3—3 of FIG. 2.

FIG. 4 is an enlarged plan view of one of the openings and cutter flanges of a shredder plate of the present invention.

FIG. 5 is a cross-sectional view taken along line 5—5 of FIG. 4.

FIG. 6 is a cross-sectional view taken along line 6—6 of FIG. 4.

As shown in FIG. 1, the present shredder disc 9 is of circular configuration and includes a generally flat planar disc 10 and overturned peripheral flange 11. The shredder plate is formed of any suitable noncorrosive material, such as 0.018-inch stainless steel. The disc portion 10 is provided with a center opening 12 and a plurality of spaced peripheral keyhole slots 13. These keyhole slots are adapted to fit over headed retaining lugs formed on a conventional mounting ring (not shown). This mounting ring is of annular configuration and includes a plurality of radial arms extending inwardly to a hub portion. The hub portion is adapted to be secured to the drive shaft of a high-speed vegetable cutter attachment of the type shown in Melvin E. Bricker U.S. Pat. No. 3,416,583 for "Vegetable Cutter Apparatus," granted Dec. 17, 1968.

In addition to the mounting keyhole openings 13, the disc 10 includes a plurality of generally circular shredder openings 14. These openings are substantially identical with one another. Openings 14 are disposed along four separate spirals, each of the spirals starting with an opening closely adjacent to center opening 12 and terminating with an opening closely adjacent to the outer diameter of the disc. The openings in the various spirals are positioned along generally radial lines. Each opening 14 has disposed adjacent thereto a cutting flange 15. The cutting flanges 15 all extend outwardly from one face of the disc and face the direction of rotation as indicated by the arrow.

The novelty of the present disc lies in the configuration of the openings 14 and cutting flanges 15 and their relationship with one another. This is best shown in FIGS. 4, 5 and 6, which disclose the openings and cutting flanges of the present disc, and by a comparison of these figures with FIGS. 2 and 3, which show a corresponding opening and cutting flange of prior art shredder discs.

More particularly, as is best shown in FIGS. 4 and 5, cutting flange 15 is struck outwardly from the plane of the disc. The cutting flange, in accordance with the present invention, forms a curved hump which tapers in width from a wide cutting edge portion 16 forming an extension of the periphery of opening 14 to an apex 17 lying in the plane of the disc. In accordance with the present invention, the length L of the cutting flange is made substantially equal to one-half of the diameter D of the shredding opening 14. The angle which the centerline of the cutting flange makes with the plane of the disc is of the order of 40°. In contrast, the relationship of the cutting flanges and openings of the prior art shredding disc are shown in FIGS. 2 and 3. As there shown, it was conventional in the prior art shredder discs to construct the discs so that the length of the cutting flange L' was approximately equal to the diameter D' of the shredder opening. The centerline of the cutting flange formed an angle of approximately 25°.

One preferred form of shredder plate is 9 inches in diameter and includes 84 openings 14. Each of these openings is approximately nine thirty-seconds inch in diameter. The length L of the flange is approximately one-eighth inch and the highest point of the cutting flange is approximately one-sixteenth inch above the surface of the planar disc 10.

In operation, the shredder disc 9 is mounted on an annular mounting member (not shown) with the smooth side 18 of the disc in abutment with the mounting ring and adjacent to the discharge passage of the vegetable slicer. The cutting flanges 15 face the hopper portion of the slicer. When the motorized power unit is turned on, the disc is revolved at a speed of the order of 600–800 r.p.m. The material to be comminuted; for example, cabbage, potatoes, celery or carrots, is placed in the hopper and is urged into contact with the rotating cutter flanges. These flanges chop up the material which then passes through the openings 14 and enters the discharge passage of the vegetable cutter through which the material is discharged into a tray, bowl or the like.

The material comminuted using the present shredder plate is markedly superior to that comminuted using a shredder plate of the prior art, like that shown in FIGS. 2 and 3, in that it is extremely uniform, has a minimum of liberated juice and, in the case of cabbage, has a relatively short length of shred.

Having described my invention, I claim:

1. A circular shredder plate for use in a high-speed rotary vegetable cutter, said plate comprising a flat disc portion, a plurality of shredder openings formed in said disc portion, a plurality of cutter flanges respectively disposed adjacent to each of said openings, each of said flanges including a cutting edge forming an extension of the periphery of the adjacent opening, each said flange being of arcuate bowed configuration and tapering from a wide portion at said cutting edge to an apex portion remote from said cutting edge, the length of said cutting flange along the centerline thereof being substantially equal to one-half of the diameter of said opening.

2. The shredder plate of claim 1 in which said cutting flange makes an angle of substantially 40° with respect to the plane of said disc.

3. A circular shredder plate for use in a high-speed rotary vegetable cutter, said plate comprising a flat disc portion, a plurality of shredder openings formed in said disc portion, a plurality of cutter flanges respectively disposed adjacent to each of said openings, each of said flanges including a cutting edge forming an extension of the periphery of the adjacent opening, each said flange being of arcuate bowed configuration and tapering from a wide portion at said cutting edge to an apex portion remote from said cutting edge, said cutting flange along the centerline thereof forming an angle of approximately 40° with the plane of said disc.